US012442528B1

(12) United States Patent
Zheng

(10) Patent No.: US 12,442,528 B1
(45) Date of Patent: Oct. 14, 2025

(54) TABLE WITH RECESSED LIGHT STRIPS

(71) Applicant: JOININ GLOBAL PTE. LTD., Singapore (SG)

(72) Inventor: Hongbing Zheng, Hangzhou (CN)

(73) Assignee: JOININ GLOBAL PTE. LTD., Singapore (SG)

( * ) Notice: Subject to any disclaimer, the term of this patent is extended or adjusted under 35 U.S.C. 154(b) by 0 days.

(21) Appl. No.: 18/823,741

(22) Filed: Sep. 4, 2024

(30) Foreign Application Priority Data

Aug. 9, 2024 (CN) ......................... 202421932987.6

(51) Int. Cl.
*F21V 33/00* (2006.01)
*F21S 4/28* (2016.01)
*F21Y 115/10* (2016.01)

(52) U.S. Cl.
CPC ............ *F21V 33/0012* (2013.01); *F21S 4/28* (2016.01); *F21Y 2115/10* (2016.08)

(58) Field of Classification Search
CPC .... A47B 2220/0075; A47B 2220/0077; F21V 33/0012; F21S 4/28; F21S 4/26; F21S 8/02; F21S 8/026; F21W 2131/301
See application file for complete search history.

(56) References Cited

U.S. PATENT DOCUMENTS

| | | | | | |
|---|---|---|---|---|---|
| 1,739,337 | A * | 12/1929 | Von Canon | F21V 33/00 | 362/130 |
| 1,906,626 | A * | 5/1933 | Kramer | F21V 11/00 | 362/130 |
| 4,689,726 | A * | 8/1987 | Kretzschmar | F21S 4/20 | 362/127 |
| 7,510,309 | B1 * | 3/2009 | Rizzo | F21V 33/0012 | 362/418 |
| 7,744,252 | B2 * | 6/2010 | Maxik | F21V 29/87 | 362/249.02 |
| 7,854,527 | B2 * | 12/2010 | Anderson | F21V 33/0012 | 362/217.1 |
| 9,854,919 | B1 * | 1/2018 | Risdon | F21V 33/0012 | |
| 9,897,278 | B2 * | 2/2018 | Lin | F21V 7/05 | |
| 10,161,608 | B2 * | 12/2018 | Pallai | F21V 21/096 | |
| 10,851,988 | B2 * | 12/2020 | Rutherford | F21S 8/03 | |
| 2007/0294953 | A1 * | 12/2007 | Guillen | A47B 57/40 | 52/36.1 |
| 2008/0285260 | A1 * | 11/2008 | Sherman | F21S 4/20 | 362/133 |
| 2018/0283668 | A1 * | 10/2018 | Conrady | A47B 77/08 | |

FOREIGN PATENT DOCUMENTS

CN 215820108 U 2/2022

* cited by examiner

*Primary Examiner* — Ismael Negron
(74) *Attorney, Agent, or Firm* — IPRTOP LLC

(57) ABSTRACT

A table includes at least one light strip component and a table board. The table board is provided with at least one accommodating groove penetrating the table board in a top-down direction, edges of the accommodating groove are surrounded by edges of the table board; the light strip component is mounted in the accommodating groove. The light strip component can be fixed in the accommodating groove by a fixing part, or be bonded within the accommodating groove.

6 Claims, 6 Drawing Sheets

TABLE WITH RECESSED LIGHT STRIPS

FIELD OF TECHNOLOGY

The present disclosure belongs to the technical field of lamps, and in particular relates to a table with built-in light strips.

BACKGROUND

In modern home life, gaming tables, square tables, lift tables, cabinets and the like are essential furniture. As indoor living becomes more diverse and personalized, light strips are widely used in furniture and decoration to enhance the atmosphere and meet lighting needs, including tables with light strips.

In related technology, the way to set up the light strip in the table is to stick the light strip on one side of the table board. This setup results in a single direction of light and makes the strips prone to dirt and falling off, preventing multi-directional illumination and stable fixation.

SUMMARY

The present disclosure provides a table with built-in light strips for solving the problem that the direction of light is single and light strips are prone to dirt and tend to fall off, which makes it impossible to realize multi-directional illumination and stable fixation.

In the first aspect, the present disclosure provides a table with built-in light strips, the table with built-in light strips comprises at least one light strip component and a table plate; the table board is provided with at least one accommodating groove penetrating the table board in a top-down direction, edges of the accommodating groove are surrounded by edges of the table board; the light strip component is mounted in the accommodating groove.

In one embodiment of the first aspect, the light strip component is attached to the accommodating groove by a fixing part; and/or, the light strip component is bonded within the accommodating groove.

In one embodiment of the first aspect, the light strip component is configured to be pressed into and embedded within the accommodating groove.

In one embodiment of the first aspect, a slot is a slot is provided along a lateral wall of the accommodating groove; the length of the slot is greater than or equal to that of the light strip component; and the light strip component is laid in the slot.

In one embodiment of the first aspect, the depth of the slot is greater than or equal to half of that of the light strip component.

In one embodiment of the first aspect, the light strip component comprises a light source component and wires; and the light source component is electrically connected to the wires; the light source component comprises an LED light source panel and a transparent lampshade; the LED light source panel is mounted within the transparent lampshade; the wires are provided with a control switch.

In one embodiment of the first aspect, the table board comprises at least two sub-table boards stacked; an empty space is formed between the sub-table boards; the accommodating groove is provided on one of the two sub-table boards.

In one embodiment of the first aspect, the number of the at least one accommodating groove is two or more; each of the at least one light strip component is mounted within a respective one of the at least one accommodating groove.

As described above, the table with built-in light strips of the present disclosure has the following beneficial effects:

The presently disclosed accommodating groove penetrates the table board in a top-down direction and can be arranged on any position of the table board; the light strip component is attached to the accommodating groove by a fixing part, or is bonded within the accommodating groove, or is configured to be pressed into and embedded within the accommodating groove of the table board, so that the light strip component can be mounted in the accommodating groove. Such an installation manner eliminates the need for tape and snap, and therefore the light strip won't get dirty easily and can be stably fixed; the kind of installation also provides illumination for three directions, that is, under the table, over the table, and in front of the table.

The present disclosure provides the accommodating groove penetrating in a top-down direction on any position of the table board, the light strip components can be effectively fixed by mounting on the table board, and the installation is simpler and less costly.

The light strip component of the present disclosure is set up in such a way that if it needs to be taken out for repair or replacement, the light strip component can be taken out directly, and the replacement operation is convenient and quick.

The setup of the light strip components of the present disclosure is flexible and diverse, and the light strip components can be mounted on different or multiple table boards, or one, two or more light strip components can be mounted on one table board, realizing a variety of ways of combining table boards and light strip components, and reusing the edge material of the table boards, which reduces the cost and improves the utilization rate of the materials at the same time.

The light strip components of the present disclosure are set up flexibly and diversely, and the user can set up different shapes and numbers of light strip components according to the actual demand, such as long strip, round and/or elliptical, which can provide illumination for multiple directions, comprising under the table, over the table, and in front of the table, and also satisfy the aesthetic needs and improve the user's experience.

The light strip components of the present disclosure can be directly placed in the accommodating groove of the table board, or can be placed in a small slot that is provided along a lateral wall of the accommodating groove of the table board, so that the light can be scattered by the groove to produce up-down ambient illumination, to meet the user's individual needs.

Figure 1:
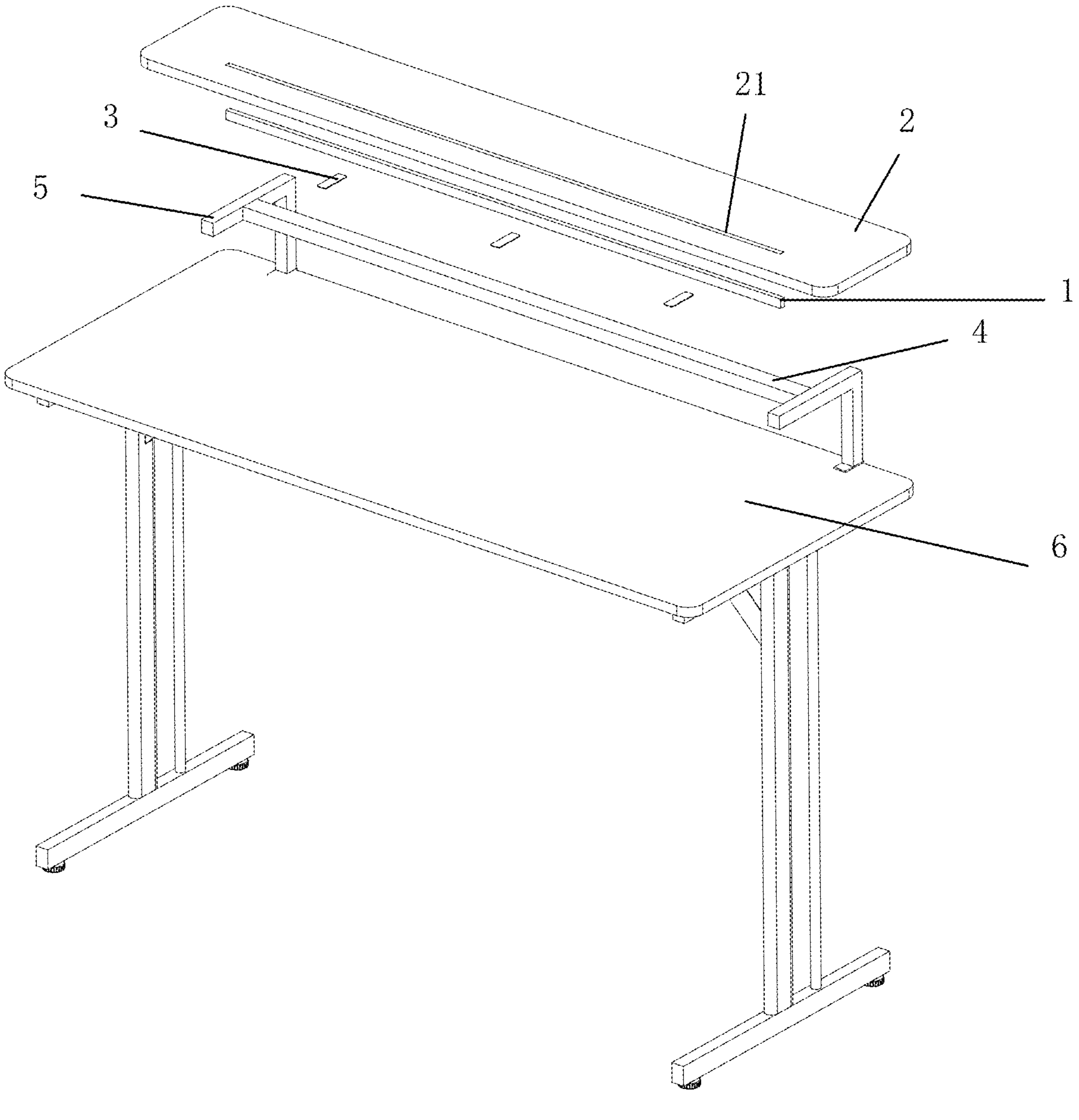
FIG. 1 shows a schematic diagram of a table with built-in light strips according to an embodiment of the present disclosure.

| Description of Reference Numerals | |
|---|---|
| 1, 1a, 1b | Light Strip Component |
| 11 | Light Source Component |
| 111 | LED Light Source Panel |
| 112 | Transparent Lampshade |
| 12 | Wires |
| 121 | Control Switch |
| 122 | Switching Interface |
| 13 | Retaining Plug |
| 2 | Table Board |
| 21, 21a, 21b | Accommodating Groove |
| 211 | Slot |
| 22 | Sub-Table Board |
| 221 | Top Board |
| 222 | Middle Board |
| 2221 | Accommodating Groove |
| 223 | Side Board |
| 23 | Empty Space |
| 3 | Fixing part |
| 4 | Support Part |
| 5 | Bracket |
| 6 | Desktop |

DETAILED DESCRIPTION

The embodiments of the present disclosure will be described below. Those skilled can easily understand other advantages and effects of the present disclosure according to the contents disclosed by the specification. The present disclosure can also be implemented or applied through other different specific embodiments. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

The following embodiments of the present disclosure provide a table with built-in light strips, which can solve the problem that the direction of light is single and light strips are prone to dirt and easy to fall off, which makes it impossible to realize multi-directional illumination and stable fixation.

The following will elaborate the principle and implementation of a table with built-in light strips of the present embodiment in conjunction with the accompanying drawings, so that those skilled in the art can understand the table with built-in light strips of the present embodiment without creative labor.

As shown in FIG. 1, the present disclosure provides a table with built-in light strips, the built-in light strip components comprise at least one light strip component 1 and a table board 2;

The table board 2 is provided with an accommodating groove 21 penetrating the table board in a top-down direction, and edges of the accommodating groove 21 are surrounded by edges of the table board; the light strip component 1 is mounted in the accommodating groove 21; the accommodating groove 21 is a through groove.

Specifically, the accommodating groove 21 provided on the table board 2 is a through groove penetrating the table board in a top-down direction. The light strip component can be effectively fixed by placing it in the accommodating groove 21, the installation is simpler and less costly, and at the same time provides illumination for three directions, comprising under the table, over the table, and in front of the table.

It is to be noted that the accommodating groove 21 may be dug at any position of the table board 2, which may be decided by the user according to the actual needs.

In an embodiment of the present disclosure, the table board 2 is the main board of a desktop 6 or includes various sub-table boards stacked on the desktop 6.

Specifically, for the table board 2, there are a variety of different situations; for example, the table board 2 may be the main board of a desktop 6 or it may include various sub-table boards stacked on the desktop 6. By combining different shapes of table board 2, light strip components, and desktops, it is possible to realize a variety of ways to combine table boards with light emitting sources, reuse the edge material, and reduce the cost while improving the utilization rate of the boards.

In an embodiment of the present disclosure, the light strip component 1 is attached to the accommodating groove 21 by a fixing part 3.

In another embodiment of the present disclosure, the light strip component 1 is bonded within the accommodating groove 21.

Specifically, regardless of whether the table board 2 is the main board of the desktop 6 or it includes various sub-table boards stacked on the desktop 6, the light strip component 1 can be fixedly mounted in the accommodating groove 21 of the table board 2 by a fixing part 3.

In an embodiment of the present disclosure, the table board 2 is fixedly mounted to the desktop by a support part 4; the support part 4 is fixed to the desktop 6 by a bracket 5.

Specifically, in an embodiment, the table board 2 includes various sub-table boards stacked on the desktop 6, the table board 2 is fixed to the desktop by a support part 4; the support part 4 is fixed to the desktop 6 by a bracket 5.

In an embodiment of the present disclosure, the fixing part 3 is removably provided on the support part 4 for fixing the light strip component 1 on the table board 1.

FIG. 1 shows a schematic diagram of a setup method in which the fixing part 3 is removably provided on the support part 4 according to an embodiment of the present disclosure. As shown in FIG. 1, in one embodiment of the present embodiment, the table board 2 is one of various sub-table boards stacked on the desktop 6, when installing the light strip, the fixing part 3 is used to fix the light strip component 1 in the accommodating groove 21 of the table board 2, and the support part 4 is a beam, which is fixed to the desktop 6 by a bracket 5, and the fixing part 3 is removably set on the support part 4 by means of gluing or otherwise, so that the light strip is stably fixed without tape, snap or other fixing methods, and at the same time provides illumination for three directions, comprising under the table, over the table, and in front of the table.

In an embodiment of the present disclosure, the fixing part 3 is fixedly set on the support part 4 for fixing the light strip component 1 on the table plate 1.

Figure 2:
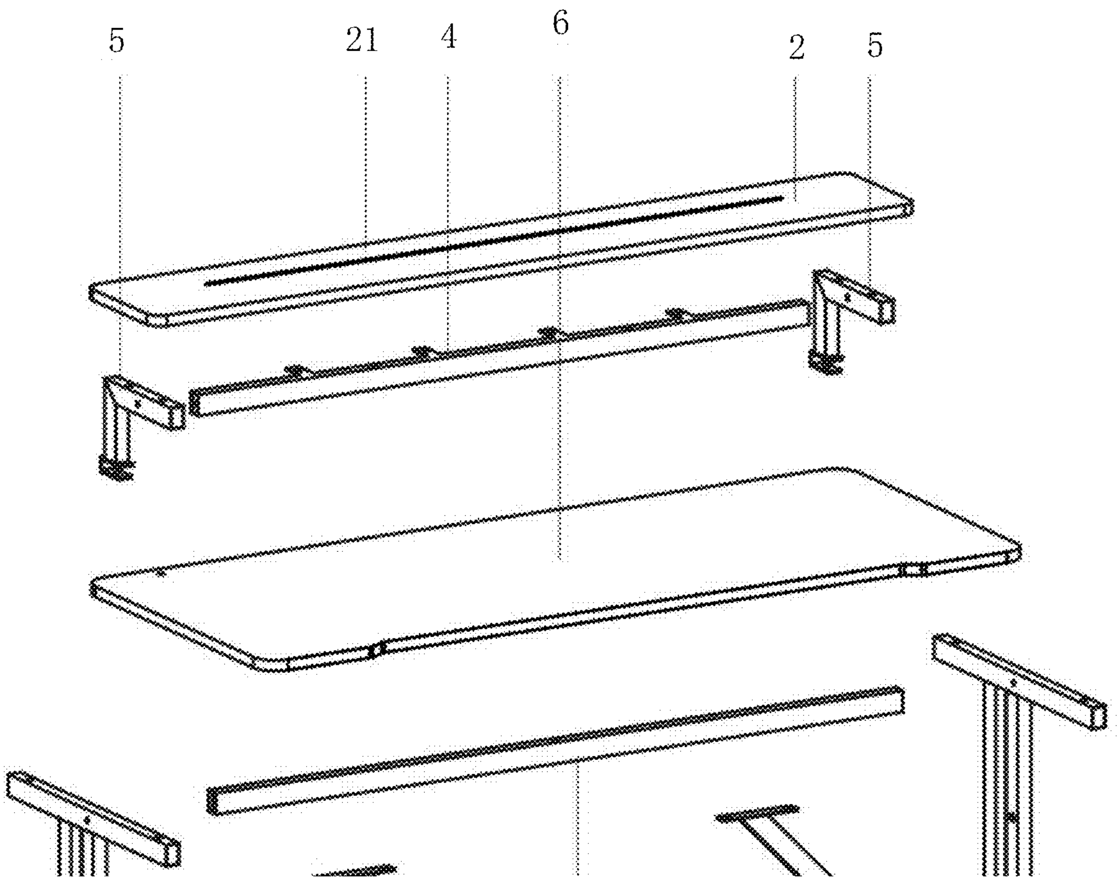
FIG. 2 shows a schematic diagram of a setup method in which a fixing part is fixedly mounted on a support part according to an embodiment of the present disclosure.

FIG. 2 shows a schematic diagram of a setup method in which the fixing part 3 is fixedly set on the support part 4 according to the embodiment of the present disclosure. As shown in FIG. 2, in one embodiment of this embodiment, the table board 2 includes various sub-table boards stacked on the desktop 6, when installing the light strip, the fixing part 3 is welding fixed to the support part 4, and by adjusting the position of the support part 4, it can be realized that the fixing part 3 can directly fix and support the bottom of the table board 2 and the light strip component 1, and so that the light strip is permanent fixed without tape, snap or other fixing methods, won't get dirty easily, and can be stably fixed, and at the same time provides illumination for three directions, comprising under the table, over the table, and in front of the table. When the light strip component is faulty and needs to be taken out for repair or replacement, it can be taken out directly, and the replacement operation is convenient and quick.

In an embodiment of the present disclosure, the fixing part 3 is made of metal, plastic or wood material; the fixing part 3 comprises a tape, an auxiliary belt or a support piece.

In an embodiment of the present disclosure, the light strip component 1 is also configured to be pressed into and embedded within the accommodating groove 21.

Specifically, the fixing method of the light strip component 1 includes but is not limited to tape, auxiliary belt, support piece or being pressed into and embedded within the accommodating groove, etc., so that the light strip can be stably fixed without tape, snap or other fixing methods, and will not get dirty easily and can be stably fixed, and at the same time provides illumination for three directions, comprising under the table, over the table, and in front of the table; when the light strip component is faulty and needs to be taken out for repair or replacement, it can be taken out directly, and the replacement operation is convenient and quick.

In an embodiment of the present disclosure, the slot 211 is provided along a lateral wall of the accommodating groove 21; the length of the slot 211 is greater than or equal to that of the light strip component 1; the light strip component 1 is laid in the slot 211.

In an embodiment of the present disclosure, the depth of the slot 211 is greater than or equal to half of that of the light strip component 1.

Figure 3:
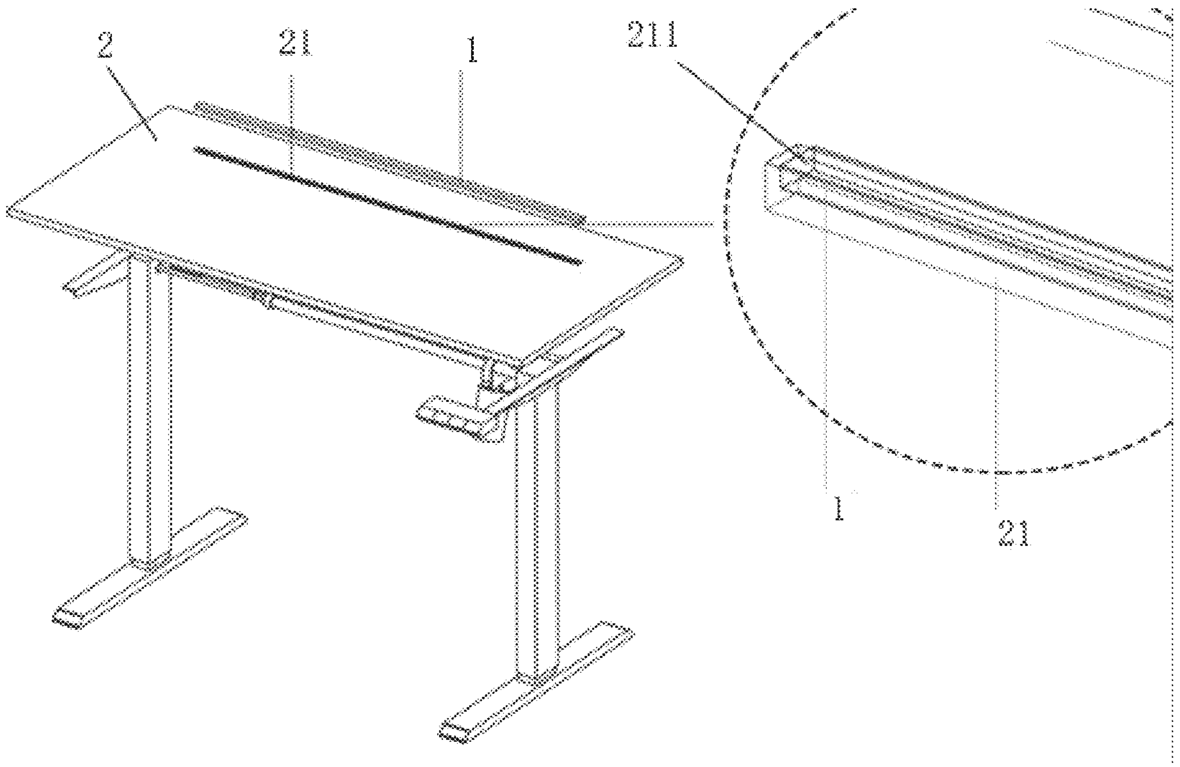
FIG. 3 shows a schematic diagram of a setup method in which a slot is provided along a lateral wall of an accommodating groove according to an embodiment of the present disclosure.
Figure 4:
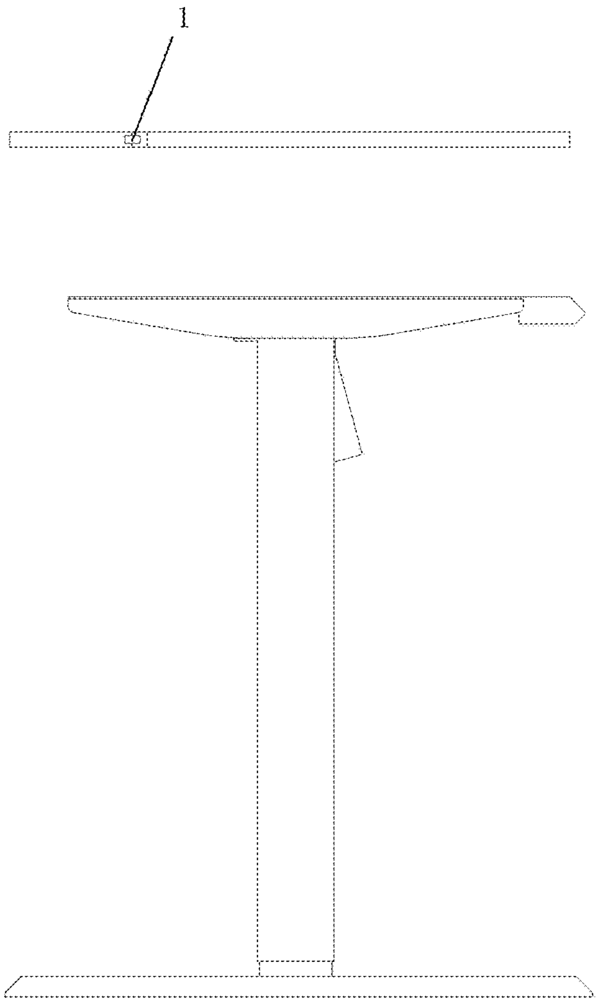
FIG. 4 shows a schematic cross-sectional view of the structure of FIG. 3 according to an embodiment of the present disclosure.

FIG. 3 shows a schematic diagram of a setup method in which the slot 211 is provided along a lateral wall of the accommodating groove 21 according to an embodiment of the present disclosure. FIG. 4 shows a schematic cross-sectional of the structure of FIG. 3 according to an embodiment of the present disclosure. Specifically, as shown in FIGS. 3 and 4, in one embodiment of the present embodiment, the table board 2 is a main board of a desktop, and the table with built-in light strips of the present embodiment comprises the table board 2 and at least one light strip component, and one difference from the above-described embodiment is that the table board herein is provided with a square accommodating groove 21, the cross-section of the square accommodating groove 21 is a stepped square (i.e., two squares stacked together, with one smaller than the other) tilted to one side, a small slot (slot 211) is provided along a lateral wall of the square accommodating groove 21, and the light strip is assembled by installing the light strip into the small slot 211, so that the light can be scattered by the square accommodating groove to produce up-down ambient illumination, to meet the user's individual needs.

The specific installation is as follows: one side of the light strip is mounted inside the small slot (slot 211) in the lateral wall of the square accommodating groove 21, and the other side is in an overhanging state, so that the light can be scattered by the square accommodating groove 21 to provide the up-down ambient illumination.

It is to be noted that regardless of whether the table board 2 is the main board of the desktop 6 or it includes various sub-table boards stacked on the desktop 6, the setup in which a slot 211 is provided along a lateral wall of the square accommodating groove 21 and the slot 211 is used for placing the light strip component 1 may be adopted.

In an embodiment of the present disclosure, the light strip component 1 comprises a light source component 11 and wires 12; and the light source component 11 is electrically connected to the wires 12; the light source component 11 comprises an LED light source panel 111 and a transparent lampshade 112; the LED light source panel 111 is mounted within the transparent lampshade 112; the wires 12 are provided with a control switch 121.

Figure 5:
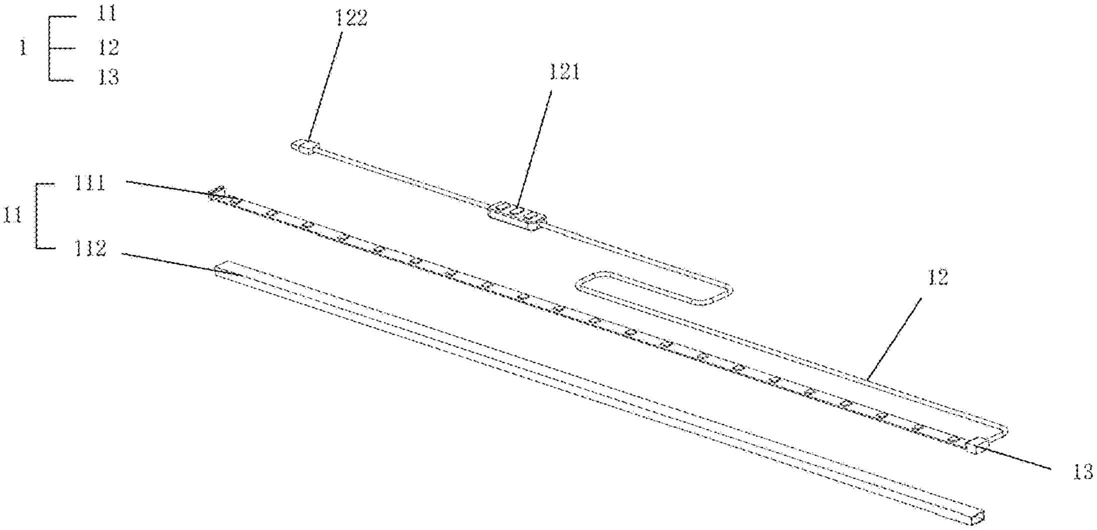
FIG. 5 shows a schematic diagram of a setup method of the light strip component according to an embodiment of the present disclosure.

FIG. 5 shows a schematic diagram of a setup method of the light strip component according to an embodiment of the present disclosure. As shown in FIG. 5, the light strip component 1 comprises a light source component 11 and wires 12; and the light source component 11 is electrically connected to the wires 12;

The light source component 11 comprises an LED light source panel 111 and a transparent lampshade 112; the LED light source panel 111 is mounted within the transparent lampshade 112; and the light source of the LED light source panel 111 is a lamp bead and/or a lamp tube; the transparent lampshade 112 is made of light transparent plastic or glass.

Specifically, the number of the light strip component(s) 1 is at least one, and the user may set up a plurality of light strip components 1 as needed.

The core component of the light strip component 1 is an LED light source panel 111, and the light source of the LED light source panel 111 includes but is not limited to, lamp beads, lamp tubes, and the like.

The transparent lampshade 112 is a protective lampshade for protecting the LED light source panel 111. the transparent lampshade 112 is made of a light transparent plastic such as PC, PP, PE, ABS or a glass.

The light source component 11 of the light strip component 1 is fixedly electrically connected to a corresponding the wires 12 by means of a retaining plug 13.

The wires 12 are provided with a control switch 121 and a switch interface 122, the light source component 11 is powered by the power supply through the switch interface 122; the control switch 121 can be used to control the on and off as well as the brightness of the light strip component 1. The switch interface 122 includes but is not limited to a USB port or plug.

It is to be noted that when arranging the light strip component, it is only necessary to place the light source component 11 of the light strip component 1 in the accommodating groove 21 of the table board 2, and that both the wires 12 and the retaining plug 13 may be left out of the accommodating groove, to facilitate powering the light source component 11 through the wires 12.

In an embodiment of the present disclosure, the table board 2 comprises at least two sub-table boards 22 stacked; an empty space 23 is formed between the sub-table boards 22; the accommodating groove 21 is provided on one of the two sub-table boards 22.

Figure 6:
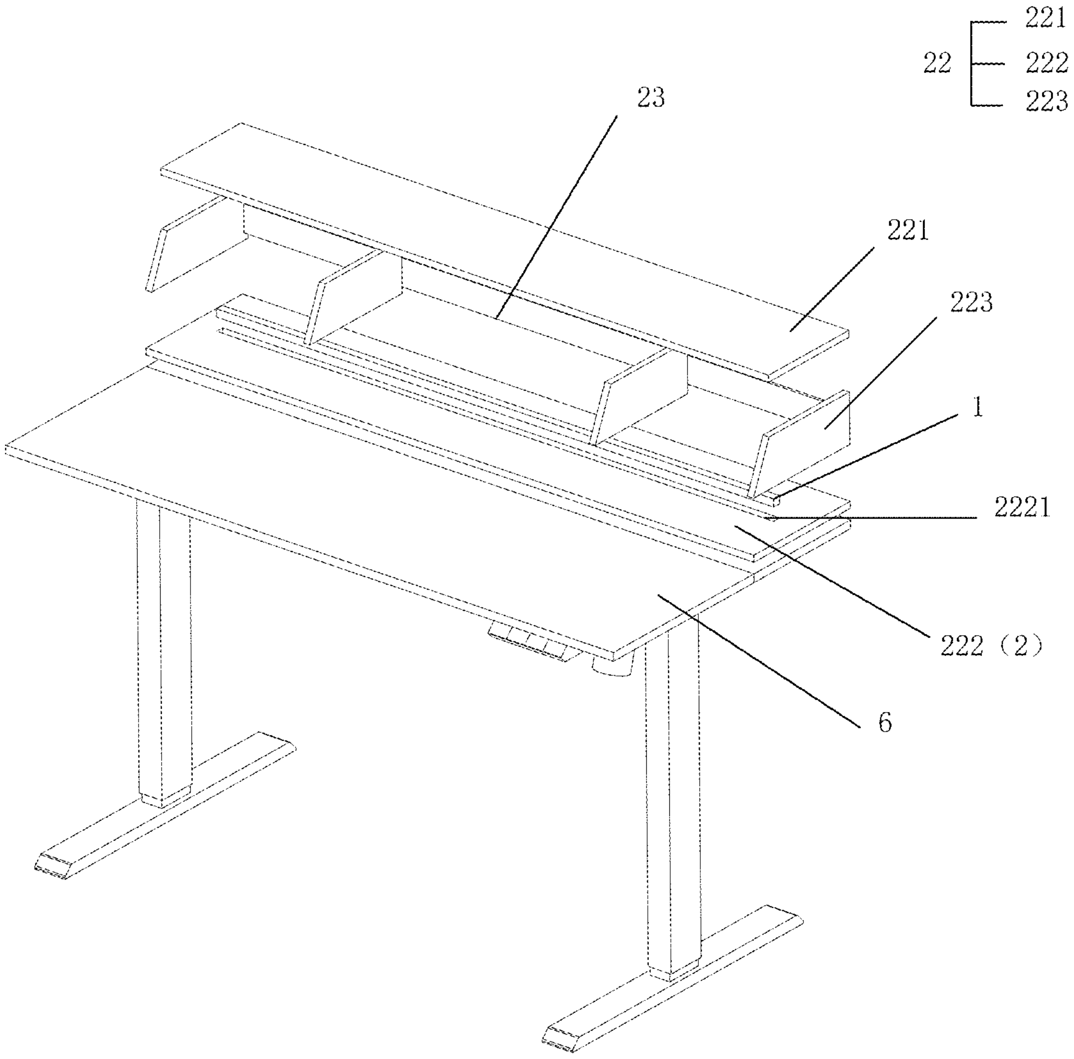
FIG. 6 shows a schematic diagram of a setup method of a table with built-in light strips according to an embodiment of the present disclosure.

FIG. 6 shows a schematic diagram of a setup method of a table with built-in light strips according to an embodiment of the present disclosure. As shown in FIG. 6, in an embodiment, the table board includes two or more sub-table boards stacked together. The following takes as example an enclosed table board for monitors.

Specifically, in one embodiment of the present embodiment, the table board is an enclosed table board for monitors, two sub-table boards stacked (top board 221 and middle board 222) are provided on the table board, and are secured to form the enclosed table board for monitors by side board 223 and top board 221, and the enclosed table board for monitors is set on the middle board 222 by screws, steel tubes, or glue, and fixing the middle board 222 to the desktop 6 through lifting the steel tube by a gap of 2 mm, setting the light strip component 1 in the accommodating groove 2221 of the middle board 222, and the fixing methods of the light strip component 1 include but are not limited to pressing into and embedding within the accommodating groove, gluing, and fixed by a fixing part under the board, so that the light strip component 1 can realize the luminescence of the top and bottom panels of the middle board 222 to realize the maximum degree of illumination.

It is to be noted that the accommodating groove 21 may be set on any sub-table board 22, such as the top board 221, the middle board 222, and the side board 223, and the user may set them according to the actual needs.

In an embodiment of the present disclosure, the number of the accommodating grooves are two or more; each of the at least one light strip component is mounted within a respective one of the at least one accommodating groove.

Specifically, in one embodiment, there are two or more accommodating grooves 21; each of the light strip components 1 is mounted within a respective accommodating groove 21. the number of accommodating grooves 21 is the same as that of the light strip components 1, and each accommodating groove 21 is structurally matched to the light source component 11 of each light strip component 1, so as the light source component 11 of each light strip component 1 may be placed within each accommodating groove 21. The wires 12 of each light strip component 1 are placed outside the table for powering the light source component 11. The wires 12 of each light strip component 1 are provided with a control switch 121 and a switch interface 122, the light source component 11 is powered by the power supply through the switch interface 122, and the control switch 121 can be used control the on and off as well as the brightness of the light strip component 1. The switch interface 122 includes but is not limited to a USB port or plug.

The light source component 11 of each light strip component 1 is fixedly connected to a corresponding the wires 12 by means of a retaining plug 13.

It is to be noted that the size and shape of the light source component 11 of each light strip component 1 can be customized according to the user's needs, such as long strip, round and/or elliptical. Similarly, the size of the wires 12 of each light strip component 1 can be customized according to the user's needs. No specific limitations are imposed here.

Figure 7:
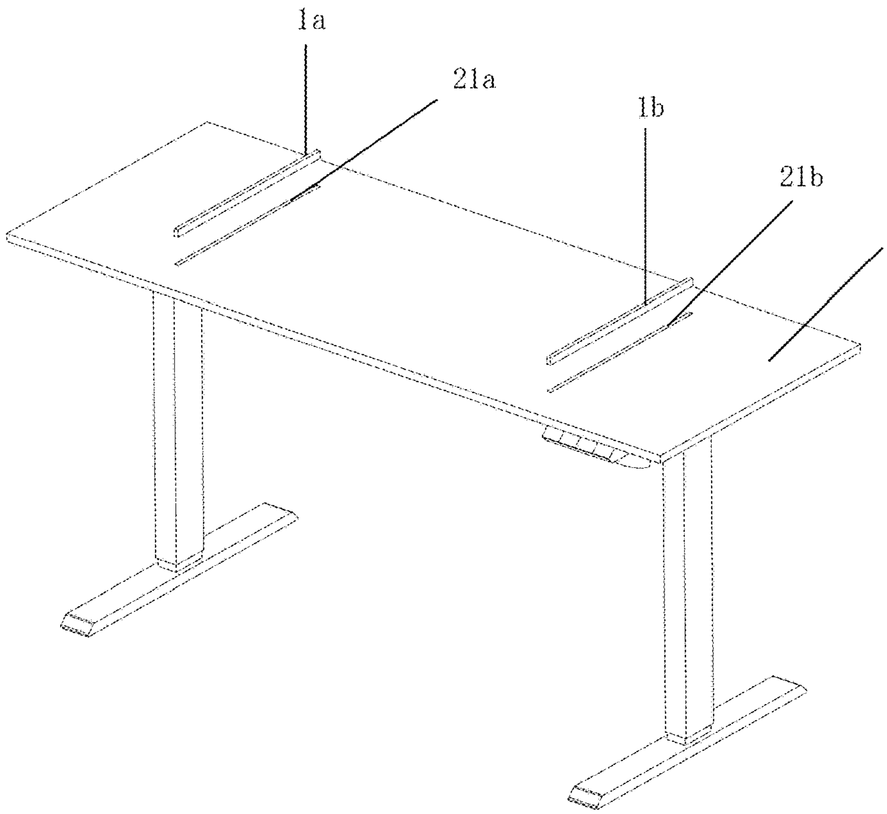
FIG. 7 shows a schematic diagram of a setup method of the accommodating groove of the table board according to an embodiment of the present disclosure.

FIG. 7 shows a schematic diagram of a setup method of the accommodating groove 21 of the table board 2 according to an embodiment of the present disclosure. As shown in FIG. 7, in one embodiment of the present embodiment, the table board 2 is a main board, and the table board 2 is provided with two accommodating grooves 21 (21*a* and 21*b*), corresponding to two light strip components 1 (1*a* and 1*b*), and the light strip components and the accommodating grooves are equal in number and structurally matched, and each light strip component is placed in each accommodating groove of the table board in a manner including, but not limited to, pressing into and embedding within the accommodating groove, gluing, and fixed by a fixing part under the board, so that the light strip can realize multi-directional illumination both over the table top and under the table.

Figure 8:
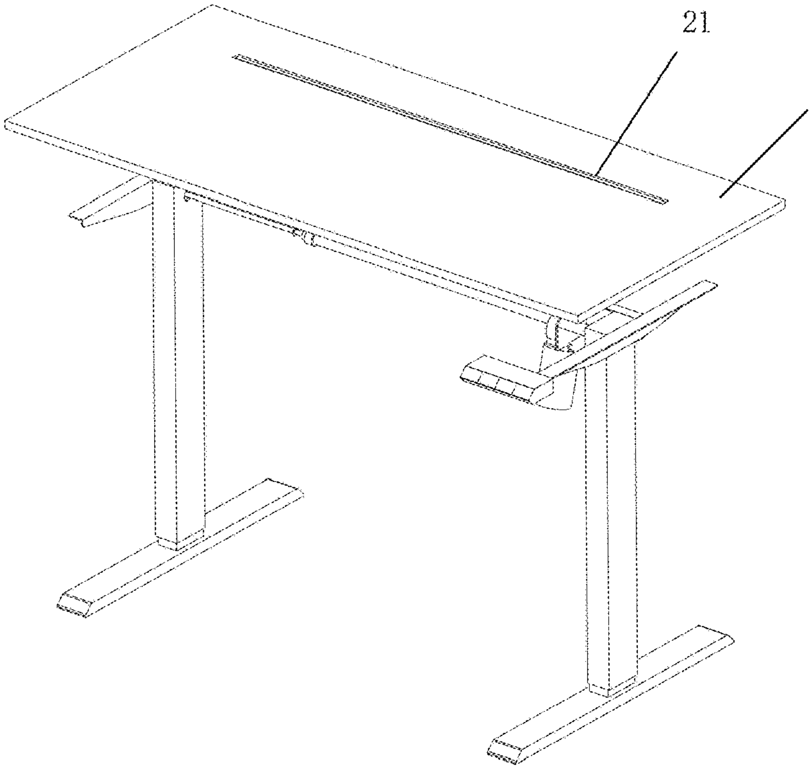
FIG. 8 shows a schematic diagram of another setup method of the accommodating groove of the table board according to an embodiment of the present disclosure.

FIG. 8 shows a schematic diagram of another setup method of the accommodating groove 21 of the table board 2 according to an embodiment of the present disclosure. As shown in FIG. 8, in one embodiment of the present embodiment, the table board 2 is a main board, the table board 2 is provided with an accommodating groove and a corresponding light strip component; the light strip component and the accommodating groove are equal in number and structurally matched, the light strip component is placed in the accommodating groove of the table board in a manner including, but not limited to, pressing into and embedding within the accommodating groove, gluing, and fixed by a fixing part under the board, so that the light strip can realize multi-directional illumination both over the table top and under the table.

It is to be noted that the number of the light strip component and the accommodating groove includes, but is not limited to, one, two or more, and the orientations thereof includes, but is not limited to, horizontal, vertical and the like. Both the number and orientations can be adjusted by users as needed.

The light strip components of the present disclosure are set up flexibly and diversely, and the user can set up different shapes and numbers of light strip components according to the actual demand, such as long strip, round and/or elliptical, which can provide illumination for three directions, comprising under the table, over the table, and in front of the table, and also satisfy the aesthetic needs and improve the user's experience.

As described above, the table with built-in light strips of the present disclosure has the following beneficial effects:

The presently disclosed accommodating groove penetrates the table board in a top-down direction and can be arranged on any position of the table board; the light strip component is attached to the accommodating groove by a fixing part, or is bonded within the accommodating groove, or is configured to be pressed into and embedded within the accommodating groove of the table board, so that the light strip component can be mounted in the accommodating groove. Such an installation manner eliminates the need for tape and snap, and therefore the light strip won't get dirty easily and can be stably fixed; the kind of installation also provides illumination for three directions, that is, under the table, over the table, and in front of the table.

The present disclosure provides the accommodating groove penetrating in a top-down direction on any position of the table board, the light strip components can be effectively fixed by mounted on the table board, and the installation is simpler and less costly.

The light strip component of the present disclosure is set up in such a way that if needs to be taken out for repair or replacement, the light strip component can be taken out directly, and the replacement operation is convenient and quick.

The setup of the light strip components of the present disclosure is flexible and diverse, and the light strip components can be mounted on different or multiple table boards, or one, two or more light strip components can be mounted on one table board, realizing a variety of ways of combining table boards and light strip components, and reusing the edge material of the table boards, which reduces the cost and improves the utilization rate of the materials at the same time.

The light strip components of the present disclosure are set up flexibly and diversely, and the user can set up different shapes and numbers of light strip components according to the actual demand, such as long strip, round and/or elliptical, which can provide illumination for multiple directions, comprising under the table, over the table, and in front of the table, and also satisfy the aesthetic needs and improve the user's experience.

The light strip components of the present disclosure can be directly placed in the accommodating groove of the table board, or can be placed in a small slot provided along a lateral wall of the accommodating groove of the table board, so that the light can be scattered by the groove to produce up-down ambient illumination, to meet the user's individual needs.

The descriptions of the processes or structures corresponding to each of the above accompanying drawings have their own focuses, and the parts that are not described in detail in a certain process or structure can be found in the relevant descriptions of other processes or structures.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A table comprising:

a table board having at least one accommodating groove penetrating the table board in a top-down direction, edges of the accommodating groove are surrounded by edges of the table board;

at least one light strip component received in the accommodating groove; and a slot formed along a lateral wall of the accommodating groove, with a length greater than or equal to that of the light strip component, wherein the light strip component is received in the slot.

2. The table according to claim 1, further comprising at least one of a fixing part or a bonding agent, securing the light strip component within the accommodating groove.

3. The table according to claim 1, wherein the depth of the slot is greater than or equal to half of the width of the light strip component.

4. The table according to claim 1, the light strip component comprises:

a transparent lampshade;

an LED light source panel mounted within the transparent lampshade;

wires electrically connected to the LED light source panel; and a control switch provided to the wires.

5. The table according to claim 4, further comprising:

at least two sub-table boards stacked;

an empty space is formed between the sub-table boards, wherein the accommodating groove is provided on one of the two sub-table boards.

6. The table according to claim 4, further comprising at least two of the accommodating grooves, wherein at least one light strip component is mounted within a respective one of the accommodating grooves.

* * * * *